UNITED STATES PATENT OFFICE.

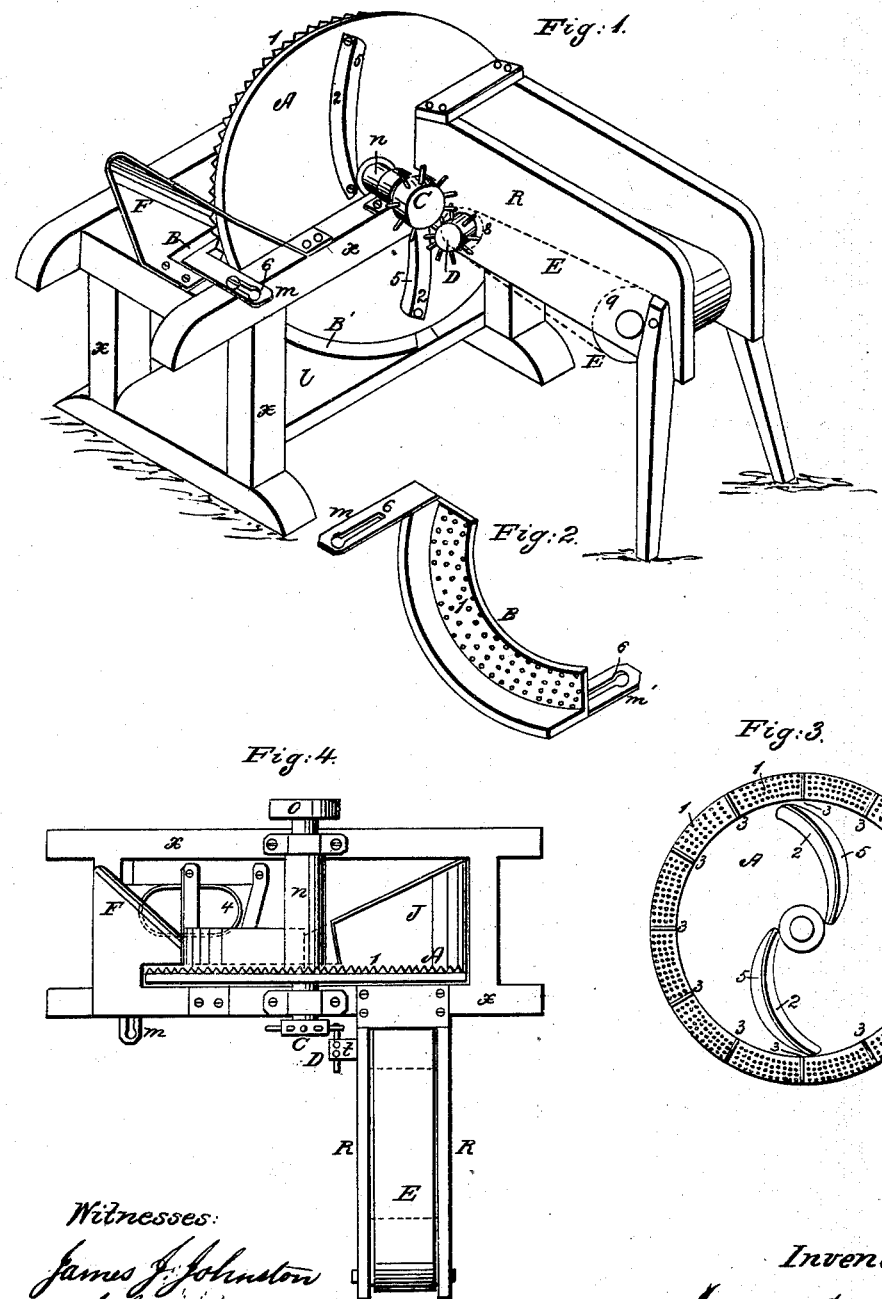

ISAAC FULTON, OF MADISON, PENNSYLVANIA.

IMPROVEMENT IN MACHINES FOR CUTTING AND GRINDING FODDER.

Specification forming part of Letters Patent No. 49,396, dated August 15, 1865.

*To all whom it may concern:*

Be it known that I, ISAAC FULTON, of Madison, in the county of Westmoreland and State of Pennsylvania, have invented a new and useful Improvement in Fodder Cutters and Grinders; and I do hereby declare that the following is a full and exact description thereof, reference being had to the accompanying drawings, and to the letters of reference marked thereon.

The nature of my invention consists in an arrangement of the several parts hereinafter described.

To enable others skilled in the art to make and use my invention, I will proceed to describe its construction and operation.

In the accompanying drawings, Figure 1 represents a perspective view of my improved fodder cutter and grinder. Fig. 2 represents the adjustable plate. Fig. 3 represents the cutting and grinding disk. Fig. 4 represents a top view of the fodder cutter and grinder.

In the drawings, $x$ represents the frame of the fodder cutter and grinder, and is constructed in the ordinary manner, the size and form of the frame corresponding to the other parts of the machine.

Across the frame $x$ is secured the shaft $n$, on which is secured the cutting-disk A, pulley $o$, and wheel or pulley $c$.

The disk A is furnished with two cutting-knives marked 2. Said knives are made in the form of a segment of circle, and are set and secured to the disk A obliquely to the plane of the shaft $n$.

In the disk A are openings, which in form correspond to the curvature of the knives 2. These openings are marked 5, and are used for the purpose of allowing the fodder cut by the knives to pass or drop into the hopper marked J, which is secured to the frame $x$ and bottom board, $l$. On one side of the disk A, near the outer edge, are teeth marked 1. These teeth may be made in any desired form, but the circle of teeth should be cut up into a number of sections by means of narrow blanks, as indicated by the lines marked 3. (See Fig. 3.)

B represents the adjustable and flexible plate, which is furnished with a flange, B′, and guides marked $m$ and $m′$, which are furnished with slots marked 6. The plate B is also furnished with teeth marked 1. These teeth correspond to the teeth on the face of the disk A. The plate B is held in its proper position to the disk A by means of set-screws, the upper end of the plate being held by the guide $m$, which is secured to the frame $x$, and the lower end is held in position by the guide $m′$. The plate B is so arranged with relation to the disk A that the teeth on the disk and plate come very close to each other, and should always be so arranged that it would be impossible for the teeth on one to strike or touch the teeth on the other.

The plate B may be held to the desired position by means of set-screws, or it may be held to its work by means of an elliptic spring, as indicated at 4.

On one end of the frame $x$ is secured a bonnet marked F, which covers the upper end of the plate B, and through an opening in said bonnet passes a part of the disk A, as represented in Fig. 4.

R represents a straw or fodder box, which is of ordinary construction. This box is secured to the frame $x$ by any known means and arranged with relation to the frame $x$ and disk A, as shown in Figs. 1 and 4.

In the front end of the straw or fodder box is placed a small pulley, indicated by the dotted line 8, and in the back end is placed a large pulley, indicated by the dotted line 9. On these pulleys is placed a belt marked E. By the use of the large pulley 9 and small pulley 8 the belt E is inclined toward the disk A, which will prevent the straw or fodder from being thrown back by the action of the disk A.

The operation of my improved fodder cutter and grinder is as follows: Power is applied to the pulley $o$, which will revolve the disk A and wheel $c$, which will revolve the wheel D, which will revolve the pulley 8, which will impart motion to the belt E and pulley 9, which will bring the fodder up to the action of the knives 2 on disk A, and the cut fodder will fall into the hopper J and pass between the plate B and disk A, the teeth of which will completely grind it, after which it will be thrown out under the bonnet F.

Having thus described the nature of my improvement, together with its construction and operation, what I claim as of my invention is—

The arrangement of the disk A, flexible and adjustable plate B, pulleys C and D, belt E, and bonnet F, the whole being arranged, constructed, and operating substantially as herein described, and for the purpose set forth.

ISAAC FULTON.

Witnesses:
JAMES J. JOHNSTON,
JOHN DAVIS.